United States Patent
Supple et al.

[11] Patent Number: 5,970,912
[45] Date of Patent: Oct. 26, 1999

[54] AUTOMATIC ANIMAL FEEDER

[76] Inventors: Kendra N. Supple, 37861 Bouquet Canyon Rd., Saugus, Calif. 91350; Mark K. Fournier, 1051 West Ave., J-7, Lancaster, Calif. 93534

[21] Appl. No.: 09/046,456
[22] Filed: Mar. 23, 1998
[51] Int. Cl.[6] ............................................. A01K 5/02
[52] U.S. Cl. ............................................. 119/51.11
[58] Field of Search .................... 119/51.11, 51.12, 119/51.14, 51.15

[56] References Cited

U.S. PATENT DOCUMENTS

| | | | |
|---|---|---|---|
| 3,256,861 | 6/1966 | Giltner | 119/51.11 |
| 3,754,527 | 8/1973 | Jenkins | 119/51.11 |
| 3,783,836 | 1/1974 | Williams | 119/51.11 |
| 4,256,054 | 3/1981 | Hitchcock | 119/51.11 |
| 4,422,409 | 12/1983 | Walker et al. | 119/51.11 |
| 4,779,569 | 10/1988 | Lopez | 119/51.11 |
| 5,345,893 | 9/1994 | Morris | 119/51.11 |

*Primary Examiner*—Thomas Price

[57] ABSTRACT

An animal feeder to automatically release feed to an animal at a set time. A housing has a releasable tray shaped to hold pellet and/or hay. The tray is released from its horizontal position to a vertical position to release the feed to the feeding trough.

2 Claims, 2 Drawing Sheets

AUTOMATIC ANIMAL FEEDER

BACKGROUND OF THE INVENTION

1. Field of the Invention

The invention is directed to an animal feeder that provides feed at a preset time.

2. Description of the Prior Art

U.S. Pat. Nos. Des. 257,794 & 286,455 show animal feeders that provide automatic feeding of food to animals.

SUMMARY OF THE INVENTION

The animal feeder has a rectangular housing with an open bottom and a pivotal tray. One side of the housing has an opening in a side wall near the housing top. The tray adjacent the opening pivots from a first position holding animal feed to a second position releasing the animal feed through the open bottom. A controller holds the tray in the first position and, at a preset signal, releases the tray to the second position.

DESCRIPTION OF THE PREFERRED EMBODIMENT

Figure 3:
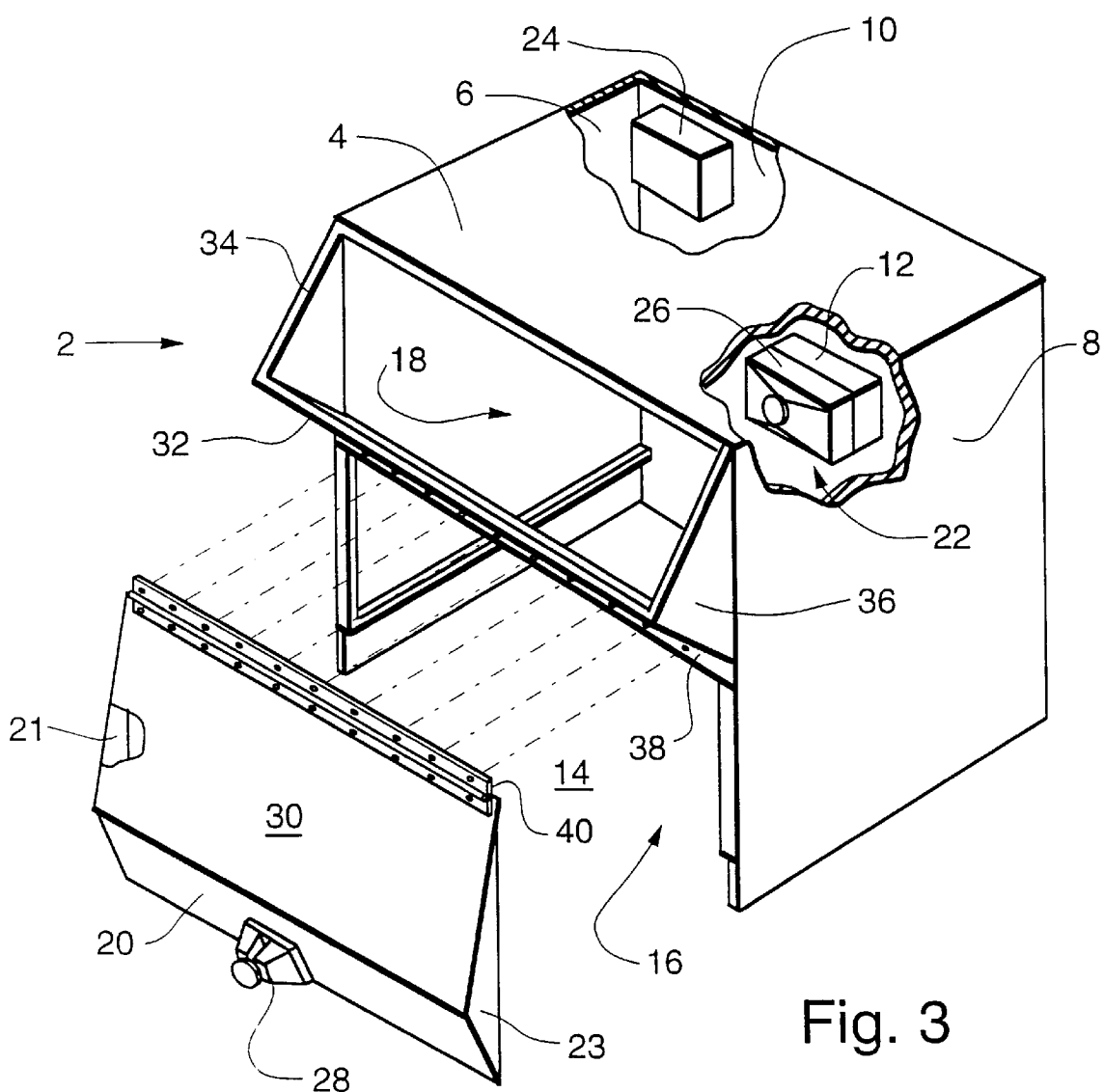
FIG. 3 is a front perspective view of the structure of FIG. 1 with the tray shown in a detached position.

The animal feeder 2, as shown in FIG. 3, has a rectangular shape with a top 4, opposed sides 6 and 8, back side 10, open bottom 14 and a front side 16 with an opening 18 and a pivotal tray 20. The shape of the feeder housing (elements 6, 8, 10 & 16) could be with a circular or other plural side shape. When feed is supplied to the feeder of FIG. 1, the feed is placed in opening 18 and rests on the tray 20. At a preset time the tray holding device 22 will release the tray and it will move to the position shown in Fig. A controller 24 selects the time to release the tray and the tray holding device is controlled by that controller. The controller can be as simple as a manually operated switch or an electric timer. The tray holding device 22 shown herein is the magnetic door holder used on fire doors and sold by Edwards Systems Tech Inc., a unit of General Signal Co. and sold as their Catalog No. 1504-N5 holding device. The preferred embodiment of the invention is a timer type controller with any type electromagnetic release device 26 (tray holding device), activated by the controller 24, to hold or release the armature structure 28 on tray 20. Device 26 is mounted on a conventional electric outlet box 12 on the back side 10. Electric wires connect controller 24 and device 26.

Figure 1:
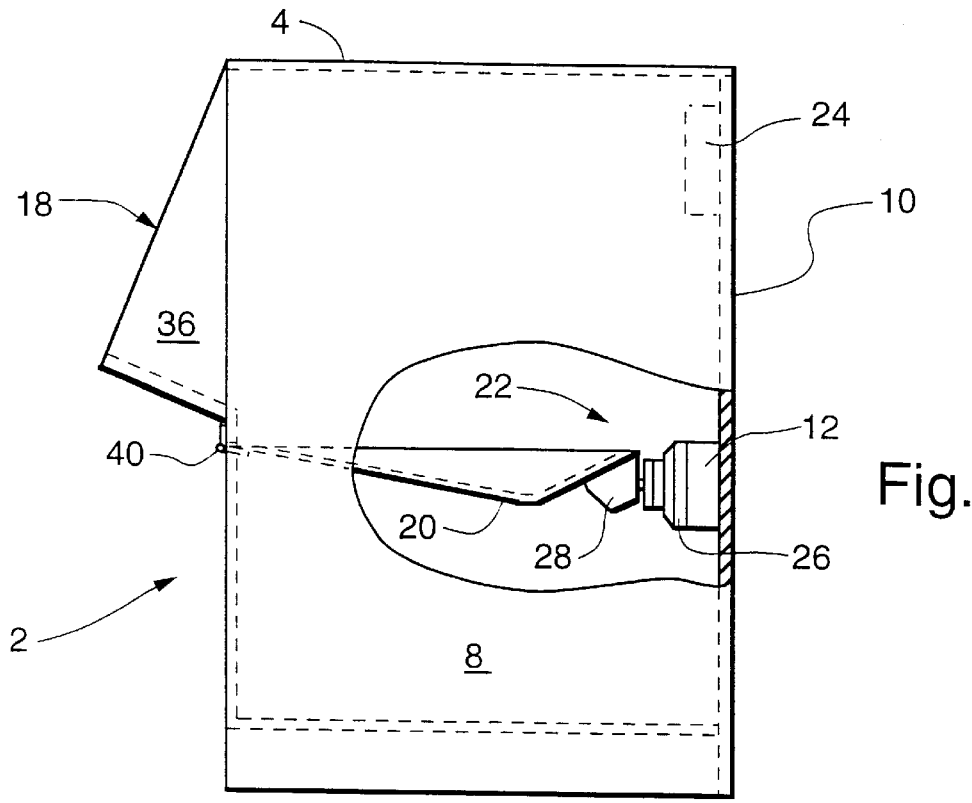
FIG. 1 is a side view of the tray in the feed holding position.

The tray bottom 30 is formed with a V-shaped configuration and triangular side walls 21 & 22 so that a trough-like structure is formed in the FIG. 1 view. This permits the tray to hold pellet shaped animal feed as well as hay, straw, etc.

The opening 18 could be left as a simple hole in the front side 16, or, provided as shown with an inclined shelf 32 with side walls 34 & 36 to aid in the placement of straw-like feed into the feeder and onto the tray.

The rectangular shape is sized to fit the standard trough used as a horse feeder so that the open bottom 14 will fit over the top of the trough and the bottom of sides 6 & 8 can be fastened to the trough. If the trough is other than a rectangular shape, the wall structures 6, 8, 10 & 16 can be shaped to the trough by any means that will fit the feed to the trough.

Figure 2:
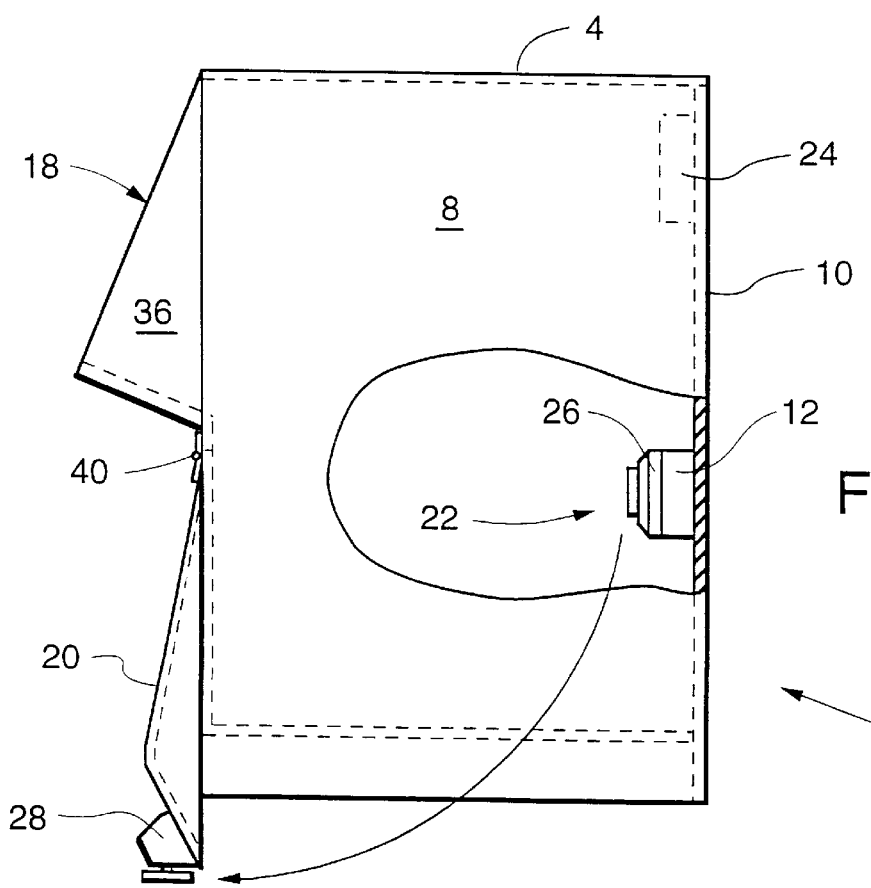
FIG. 2 is a side view of the tray in the feed releasing position.

The tray 20 is pivoted to a portion 38 of the front side 16 by a hinge 40 to permit the tray to move to the positions of FIGS. 1 & 2.

What is claimed is:

1. An animal feeder comprising:

a) a housing having a side wall structure, a top and an open bottom;

b) a portion of the side wall structure having at the top thereof an opening with an upper and lower portion and a tray means for feed positioned inside the side wall structure, and, said tray means hinged to the side wall structure adjacent the lower portion of said opening;

c) said tray means having a V-shaped configuration with triangular side walls, and when positioned parallel to said top of said housing, being capable of holding animal feed;

d) said tray means being movable to a position perpendicular to the top of said housing to drop the animal feed through the open bottom;

e) means holding said tray means in the position parallel to said top and releasing said tray means to its position perpendicular to said top;

f) said tray means comprises a two part electromagnetic release device having one part on the tray means and a second part on said side wall structure with said first and second parts engaging when said tray means is in its parallel position, and g) said second part is operated by a controller to release its contact with said first part to release said tray means.

2. An animal feeder comprising:

a) a housing having a side wall structure, a top and an open bottom;

b) a portion of the side wall structure having at the top thereof an opening with an upper and lower portion and a tray means for feed positioned inside the side wall structure, and, said tray means hinged to the side wall structure adjacent the lower portion of said opening;

c) said tray means, when positioned parallel to said top of said housing, being capable of holding animal feed;

d) said tray means being movable to a position perpendicular to the top of said housing to drop the animal feed through the open bottom;

e) means holding said tray means in the position parallel to said top and releasing said tray means to its position perpendicular to said top, and f) said open bottom being the means both to position the animal feeder over a standard trough used as a feeder for livestock and to permit the animal feed to drop out of the animal feeder into said trough.

* * * * *